May 11, 1971  C. C. MPELKAS  3,578,464

METHOD OF RIPENING FRUIT

Filed May 18, 1967

CHRISTOS C. MPELKAS
INVENTOR

BY Lawrence Burn,
ATTORNEY

United States Patent Office 3,578,464
Patented May 11, 1971

3,578,464
METHOD OF RIPENING FRUIT
Christos C. Mpelkas, Lynn, Mass., asignor to
Sylvania Electric Products Inc.
Filed May 18, 1967, Ser. No. 639,459
Int. Cl. A23l 1/00
U.S. Cl. 99—103
4 Claims

ABSTRACT OF THE DISCLOSURE

Ripening fruit that is detached from the vine unripened by exposing the fruit intermittently to periods of several hours of light being followed by several hours of darkness, the light being confined substantially to the blue, red and far red regions of the spectrum and maintaining the temperature lower during the dark period than during the light period.

BACKGROUND OF THE INVENTION

Field of the invention

The invention relates to the ripening of fruit after it is detached from the vine and no longer in contact with the remainder of the plant, and particularly to the ripening of such fruit by irradiation with light.

Description of prior art

It is known, of course, that light of certain wavelengths is effective in aiding the germination and growth of plants, and special lamps have been made and used for this purpose, as for example, the lamp shown in U.S. Pat. 3,287,586, issued Nov. 22, 1966 to W. D. Bickford.

However, such lamps have not previously been used for the ripening of detached fruit, this is fruit completely detached from the plant which bore it.

SUMMARY OF THE INVENTION

I have unexpectedly discovered that the light from such lamps can be used for the purpose of ripening fruit detached from the vine. This is quite different from the growing of plants. In fact, the fruit cut from a plant can be ripened even when the plant producing the fruit is not best helped in its growth by the same light.

The fruit ripened by my process is actually better than that ripened under ordinary sunlight and far superior to that ripened under incandescant lamps or even cool-white fluorescent lamps. The fruit is firmer and sweeter, and has a better color.

Bananas, for example, have been previously "ripened" by being treated with ethylene gas. This, however, merely changes the color of the skin from green to yellow, leaving the interior of the fruit hard and unripened. In contrast my method produces bananas which are ripened all the way through the edible portion as well as in the skin.

The nutritional value of the fruit is improved greatly by my process, because it increases the carbohydrate and sugar content of the fruit and the vitamin content as well.

To achieve these results, it is necessary to irradiate the fruit with light confined to the red, far red and blue region, that is, in the vicinity of 4300 A., which is blue, 6200 A. which is red, and 7350 A., which is far red. These colors are necessary, but the green and yellow colors between them in the spectrum are not only unnecessary but actually harmful. They are especially harmful at high light intensities because they provide unneeded energy which only serves to overheat the fruit. Incandescent light is very poor for ripening, since it not only includes the undesired green and yellow but also a considerable amount of infra-red, which heats up the fruit tremendously without maintaining the quality of the ripening process. In addition, the incandescent filament gives very little blue light. With such light, suitable intensities of red, far red and blue light for ripening cannot be achieved without increasing the infra-red so much as to overheat the food, especially on its outer surface.

The red, far-red, and blue light each have different effects, yet in combination the effect of each is enhanced; the whole is greater than the sum of all its parts. By itself, the red would produce the change of color usually associated with ripening, but would not produce the other accompanying effects of making the fruit more suitable for eating. The blue light is needed for the latter purpose, and not only increases the carbohydrate and the reducing-sugar content of the fruit, thereby improving the taste, but also increases the carotene content, thereby further increasing the nutritional value of the fruit. Carotene is a source of vitamin A. In addition, vitamin C appears to be increased by the irradiation with red, far red and blue light in combination.

The process of photosynthesis is aided by both the red and blue regions of the spectrum, so that either red or blue light would be useful for that purpose, although the use of both is better. However, the carotenoids, from which vitamin A is formed, are affected only by blue light, and red would not be beneficial to them. The use of red light alone would be ineffective for increasing the carotenoid content. Green and yellow light performs no useful function when applied to plants, and at least the green is believed to affect cell structures adversely.

Red helps to bring out the full ripe color of the fruit, and the so-called "far-red" that is, light of about 7350 angstroms in wavelength, is essential for ripening to full color and to achieve full enhancement of photosynthesis. On the other hand, the infra-red wavelengths above 8000 A. may be deleterious, since the heating causes dehydration of the fruit. This is one reason for the ineffectiveness of incandescent lamps in fruit ripening, since over 90% of the energy is an incandescent lamp is in the infra red.

The use of an appreicable amount of carbon dioxide in the ambient atmosphere enhances the effect of the light, since it facilitates the formation of carbohydrates. The fruit ripens best when the relative humidity of the ambient atmosphere is reasonably high, say between 70% and 85%, although humidities as low as 50% can be used.

The fruit should not be irradiated continuously with light, because after each light period the plants need a dark period in which to allow them to rest and grow, the main chemical reactions generally occurring during the dark period, after photosynthesis. The fruit is exposed to the light intermittently, a period of several hours of light being followed by a period of several hours of darkness. A cycle of 12 hours with the lights on and 12 hours with them off, that is in the dark, has been found very effective, although the cycle can be varied considerably.

An ambient temperature of about 70° F. is useful while the light is on, but the temperature should be about 60° F. during the dark period. This drop in temperature can often be achieved automatically, because during the dark period there will be no heating from the lamps. The amount of reduction in temperature actually achieved by turning off the lamp depends on the ambient air circulation and other factors and so the heating input to the room may have to be reduced in other ways as well, and in some cases a small amount of refrigeration may be needed.

BRIEF DESCRIPTION OF THE DRAWINGS

Other features, objects and advantages of the invention will be apparent from the following specification, taken in connection with the accompanying drawings, in which.

DESCRIPTION OF PREFERRED EMBODIMENTS

Figure 1:
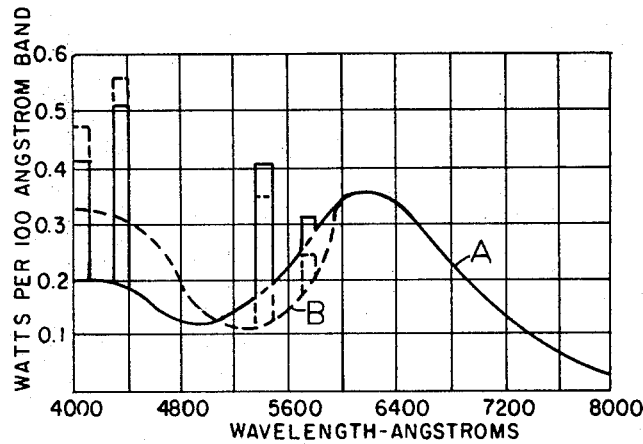
FIG. 1 is a graph of the preferred spectral energy distribution of light for ripening of detached fruit.

In FIG. 1, the curve A shows the radiation from a lamp such as shown in U.S. Pat. 3,287,516 to W. D. Bickford, issued Nov. 22, 1966, which is a spectral distribution suitable for my purpose. However, I prefer to have more blue light than that corresponding to Curve A, and less green or yellow, so my preferred spectral distribution is that shown in Curve B of FIG. 1.

Figure 2:
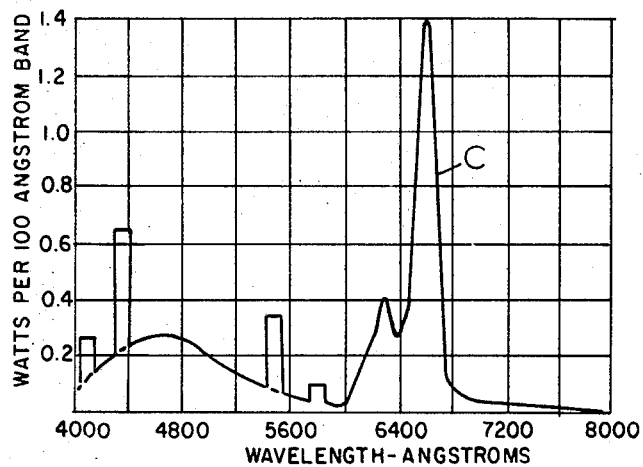
FIG. 2 is another useful distribution.

In FIG. 2, curve C shows the radiation from the lamp of U.S. patent application Ser. No. 590,439, filed Oct. 28, 1966 by Carl Bernier, now abandoned which is also useful, but not generally as effective, since it lacks the far red light between 6800 and 8000 A. (angstrom units).

Figure 3:
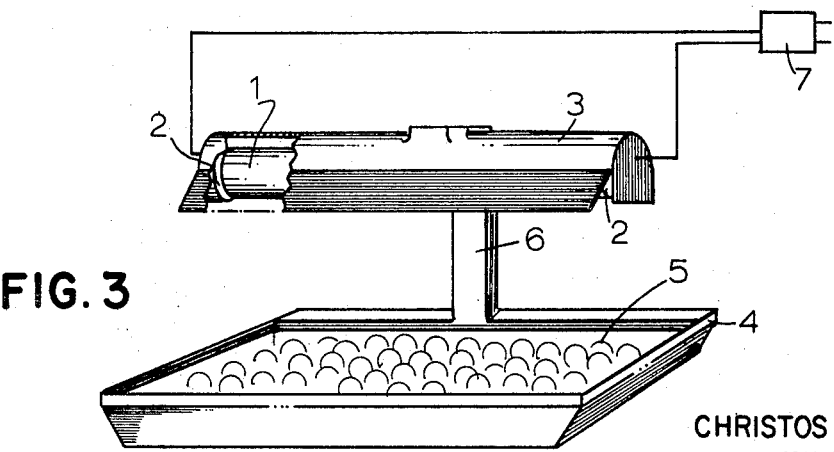
FIG. 3 is a drawing of a lamp in position to irradiate fruit.

In FIG. 3, a fluorescent lamp 1 having the proper spectral distribution is held by lampholders, often called sockets 2, 2 to a reflector 3, supported over shallow tray 4, and in position to irradiate the fruit 5 exposed to it, by a post 6 extending from the tray 4, or from a tray-holder not shown, under it. The usual current-limiting ballast, not shown, should be used with the lamp.

The tray should be shallow, so that some part of each piece of fruit will receive light from the lamp 1. A single layer of fruit would best achieve this, but due to the spaces between the fruit, light can reach a second layer underneath the first if a second layer is used. A third layer under the second would still receive some light but not much.

The lamp 1 can be a 40-watt Wide-Spectrum "Gro-Lux" fluorescent lamp made by Sylvania Electric Products Inc., Danvers, Mass. owner of the trademark "Gro-Lux." This lamp emits the spectrum shown in FIG. 1. In the example being described, it is placed above the top of tray 4, and about 12 inches above the top of the fruit. The latter is spread out in the tray which extends for the length of the lamp and may extend further. The length and width of the tray are such that they fall within the beam of light from the lamp 1, so that the fruit will receive the light. A larger tray can be used, but any fruit outside the light beam will not be helped to ripen.

An automatic timing device 7, of which many types are available, can be used in the electric circuit to turn the lamps on and off in sequences.

The ripening process will take several days, depending on the type of fruit to be ripened and the intensity of the irradiating light. In the example described above, tomatoes could be ripened from the green state in seven to eight days, and from a semi-ripened state in which a housekeeper would often receive them, in four or five days. Bananas ripen in a shorter period.

Ripening directly from the green state by my invention produces the most effective results, but the fruit bought by a housewife at a retail store will generally be partly ripened, so she will merely have to ripen it from the partly-ripened to the fully-ripened state under the lighting we have described. A considerable improvement in the completely ripened fruit is still noticed under such circumstances in the qualities previously mentioned.

The relative humidity around the fruit is preferably between 70% and 85%, for most effective results, but humidities as low as 50% can be used with good results.

The ambient "on" temperature can vary from 65° to 75° F. or even somewhat higher with good results, with the "off" or dark temperature about 60° F.

In the above and in the appended claims, the word "plant" is used to mean either plants, vines, trees, bushes or anything which grows from the ground to bear fruit.

Although I have described a specific embodiment of the invention above, I do not intend to be limited to that embodiment, but to all those that whatever claims may be allowed will cover. Various modifications will be apparent to a person skilled in the art without departing from the spirit and scope of the invention.

What I claim is:

1. A method of ripening fruit comprising detaching the fruit from the plant while still green, exposing it intermittently to light which is substantially confined to the red, far red and blue regions of the spectrum and containing blue, red and far red, maintaining the humidity at a value of at least 50%, the fruit being exposed to said light for several hours, and then kept in darkness for several hours, and maintaining the ambient temperature during the darkness substantially lower than when the fruit is exposed to said light.

2. The method of claim 1, in which the fruit is exposed to the light for about twelve hours and then kept in darkness for about twelve hours.

3. The method of claim 2, in which the temperature during the time in darkness is about 60° F. and the temperature during the time when the fruit is exposed to the light is substantially higher.

4. The method of claim 1, in which the ambient relative humidity around the fruit is kept between 70% and 85%.

References Cited

UNITED STATES PATENTS

| | | | |
|---|---|---|---|
| 1,678,046 | 7/1928 | Holmes | 99—103 |
| 2,281,625 | 5/1942 | Skinner | 99—103 |
| 3,287,586 | 11/1966 | Bickford | 313—109 |

RAYMOND N. JONES, Primary Examiner

J. M. HUNTER, Assistant Examiner

U.S. Cl. X.R.

313—109